(12) United States Patent
Atassi (10) Patent No.: US 7,845,369 B2
(45) Date of Patent: Dec. 7, 2010

(54) VOLUMETRIC-CONTROLLED SMART VALVE

(76) Inventor: Mohamed Radwan Rafaat Atassi, P.O. Box 2201, Al-Hurriya Post Office, 187 Al Ouroba St., Flat No. 8, Cairo (EG)

( * ) Notice: Subject to any disclaimer, the term of this patent is extended or adjusted under 35 U.S.C. 154(b) by 0 days.

(21) Appl. No.: 11/576,615

(22) PCT Filed: Oct. 4, 2004

(86) PCT No.: PCT/EG2004/000039

§ 371 (c)(1), (2), (4) Date: Apr. 4, 2007

(87) PCT Pub. No.: WO2006/037351

PCT Pub. Date: Apr. 13, 2006

(65) Prior Publication Data

US 2008/0073607 A1     Mar. 27, 2008

(51) Int. Cl.
*F16K 21/16*  (2006.01)

(52) U.S. Cl. .................................. 137/624.12; 137/460

(58) Field of Classification Search ............ 137/624.11, 137/624.12, 624.22, 460; 222/20; 251/20
See application file for complete search history.

(56) References Cited

U.S. PATENT DOCUMENTS

| 4,202,467 A | | 5/1980 | Rutten et al. |
| 4,903,731 A | * | 2/1990 | Pappy .................... 137/624.11 |
| 5,065,901 A | * | 11/1991 | Brane et al. .................... 222/20 |

FOREIGN PATENT DOCUMENTS

GB     2138541 A     10/1984

OTHER PUBLICATIONS

International Seacrch Report for PCT/EG2004/000039, dated Jun. 9, 2005.

* cited by examiner

*Primary Examiner*—Kevin L Lee
(74) *Attorney, Agent, or Firm*—Abelman, Frayne & Schwab (57) ABSTRACT

A volumetric metering smart valve shuts down automatically when a certain amount of liquid has passed through the valve. This valve has a water wheel which is rotated by the liquid and which drives a disc via a gear train. If the flowing amount exceeds a preset limit, the disc operates a ratchet and spring acting on a column in a closing direction to shut down the valve.

6 Claims, 8 Drawing Sheets

VOLUMETRIC-CONTROLLED SMART VALVE

CROSS-REFERENCE TO RELATED APPLICATIONS

This application is a 371 of international application number PCT/EG2004/000039, filed on Oct, 4, 2004.

BACKGROUND OF THE INVENTION

1. Field of the Invention

This invention relates to a regular valve for potable water and liquid to control and shutdown the flow of liquid in emergency cases.

2. Description of the Related Art

In computers, if there is no activity of the user, a computer system could shutdown due to lack of attendance. In an electrical system, overloads due to long running cause shutdown of the system. Water and other liquids need some control to shutdown the flow by sensing an emergency or an absence of control.

BRIEF SUMMARY OF THE INVENTION

The present invention relates to a volumetric metering smart valve which shuts down automatically when a certain amount of liquid has passed through the valve. This valve has a water wheel which is rotated by the liquid and which drives a disc via a gear train. If the flowing amount exceeds a preset limit, the disc operates a ratchet and spring acting on a column in a closing direction to shut down the valve.

BRIEF DESCRIPTION OF THE SEVERAL VIEWS OF THE DRAWINGS

Preferred embodiments of the invention are disclosed hereinbelow with reference to the drawings.

DETAILED DESCRIPTION OF THE INVENTION

The present invention is related to international application number PCT/EG2004/000039, filed on Oct. 4, 2004, which is incorporated herein by reference in its entirety.

Figure 1:
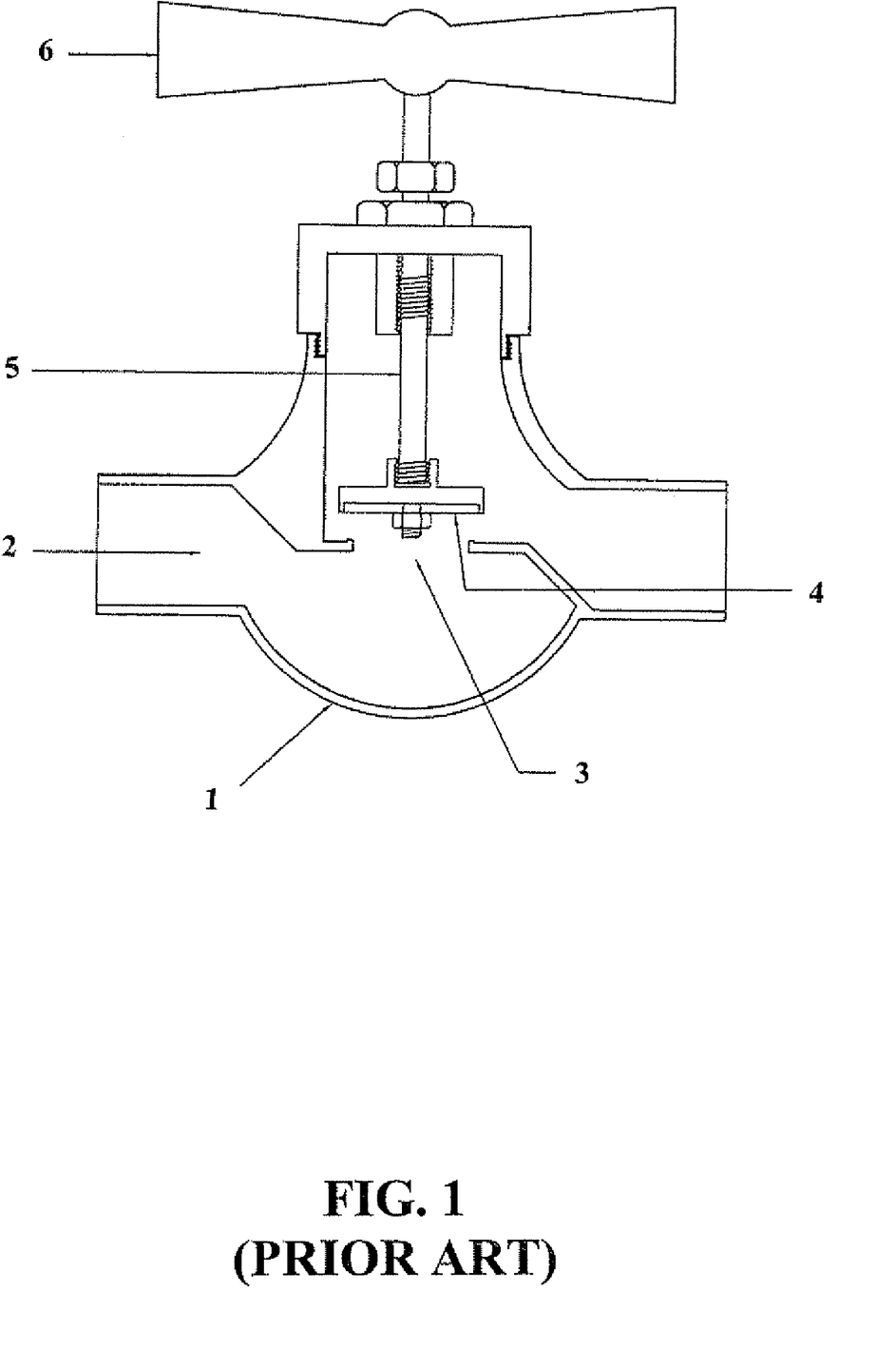
FIG. 1 is a cross-sectional view of a regular globe valve of the prior art.

The invention is to convert a regular globe valve 1 or a tap of the prior art, as shown in FIG. 1, to a smart valve which is to shutdown automatically in case of emergency through a double valving operation. Double valving means that the valve has its original closing mode set by either a mechanical device such as a hand wheel 6, or by an electrical timer, photocell, pneumatic control or level control, as well as additional valving that operates automatically in an emergency.

Figure 2:
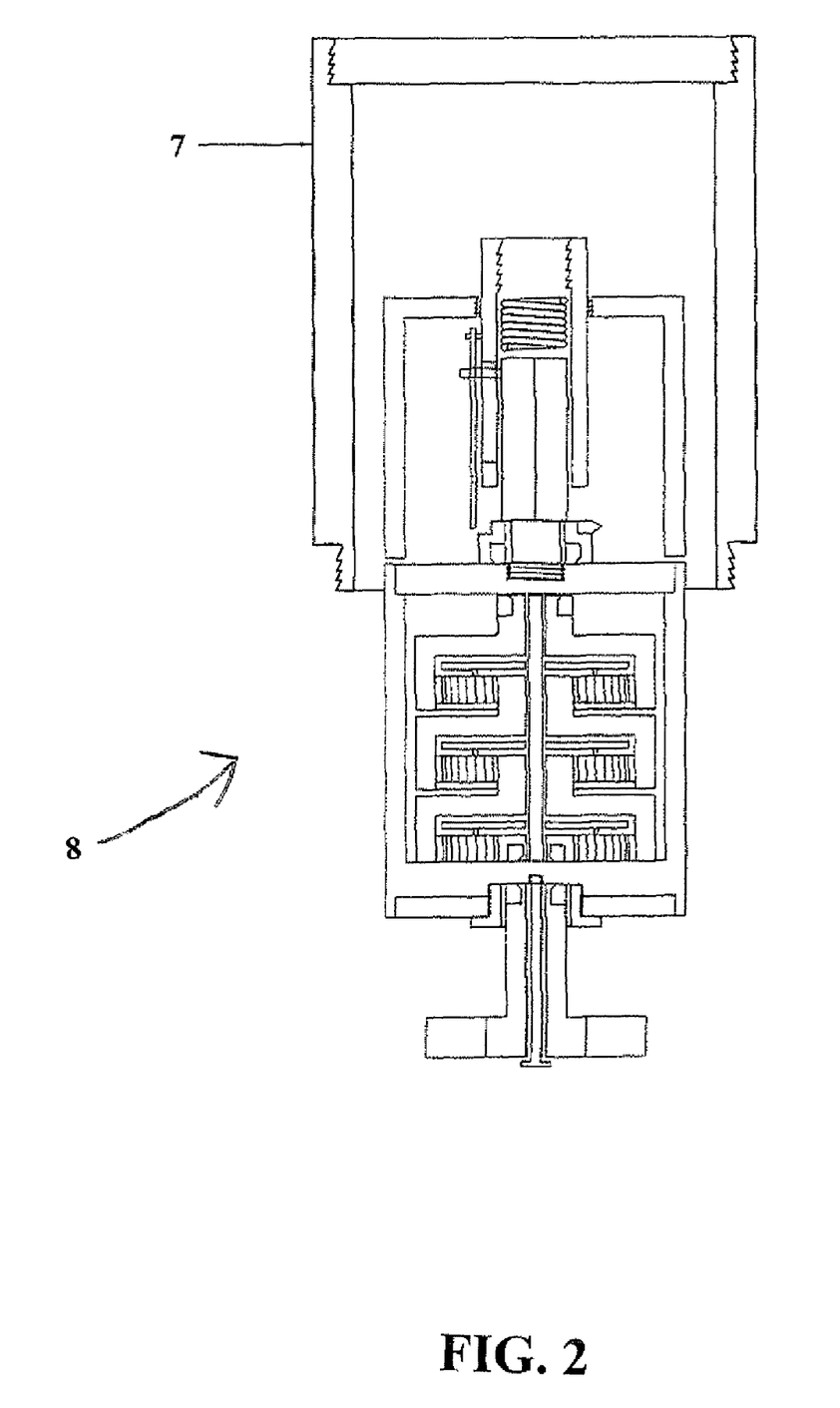
FIG. 2 is a cross-sectional view of a smart valve kit with microplanetary gear type components.
Figure 3:
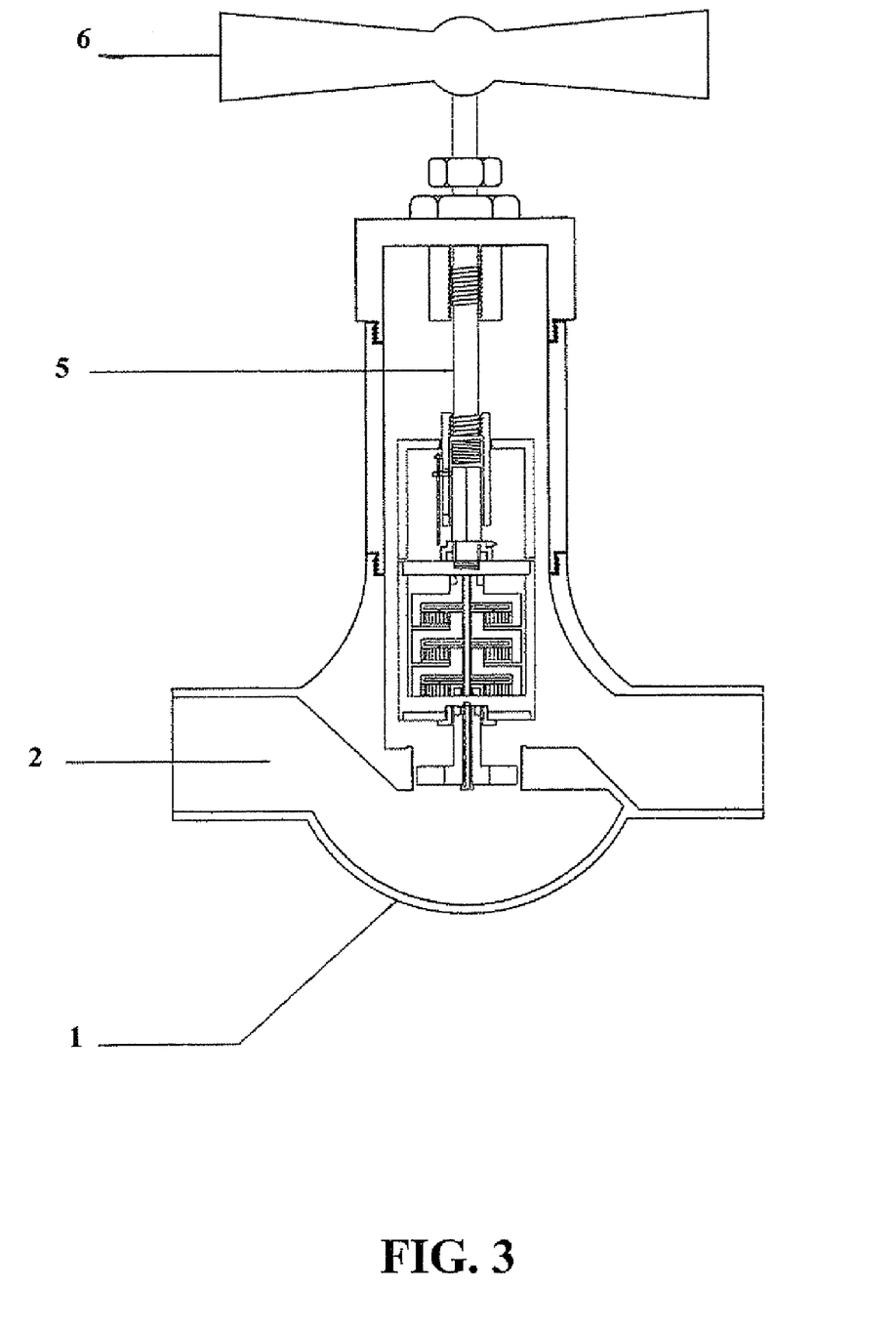
FIG. 3 is a cross-sectional view of a valve of FIG. 1 converted to be a smart valve using the smart valve kit of FIG. 2.
Figure 7:
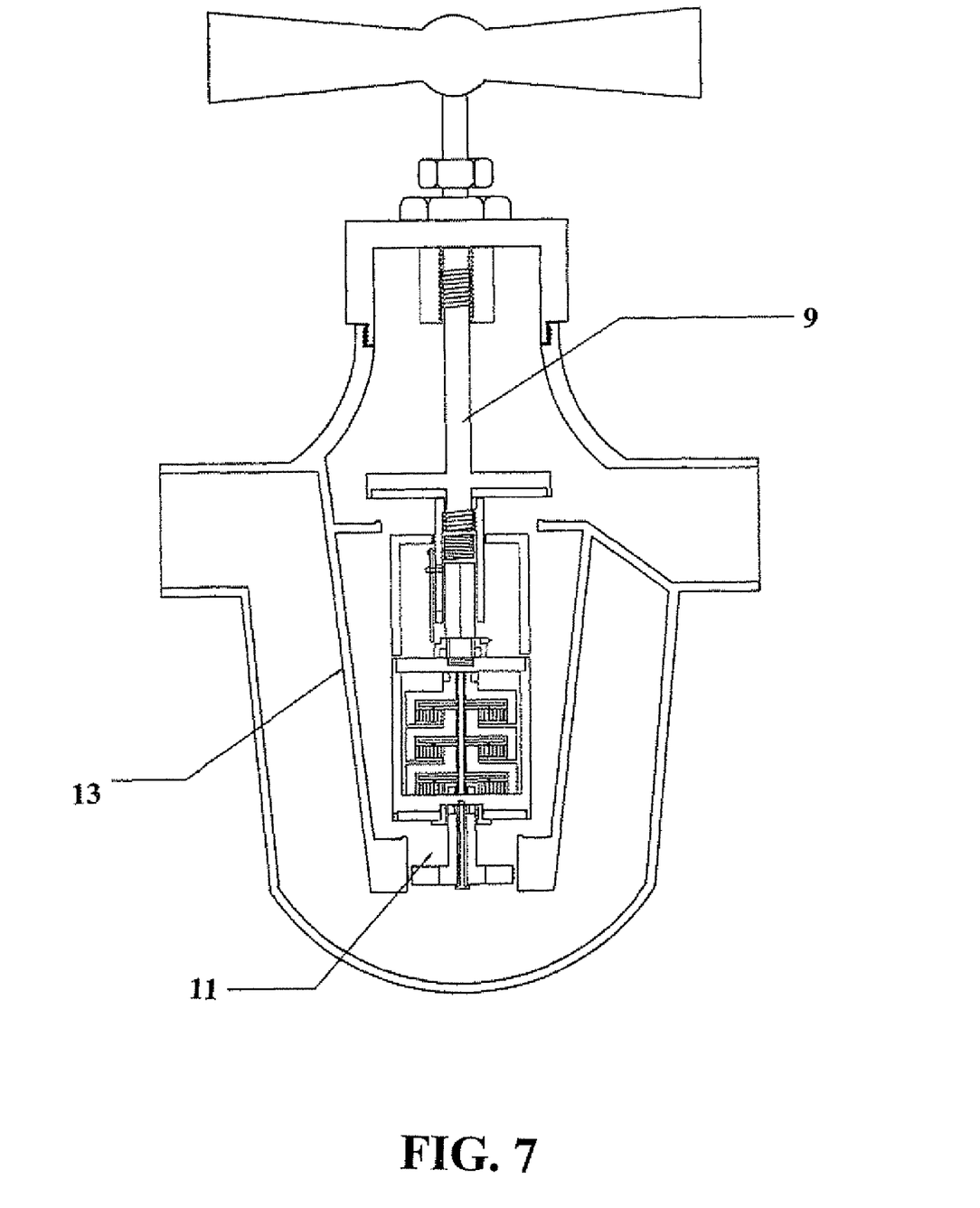
FIG. 7 is a cross-sectional view of a smart valve having two seals sealing flow in the same direction.
Figure 8:
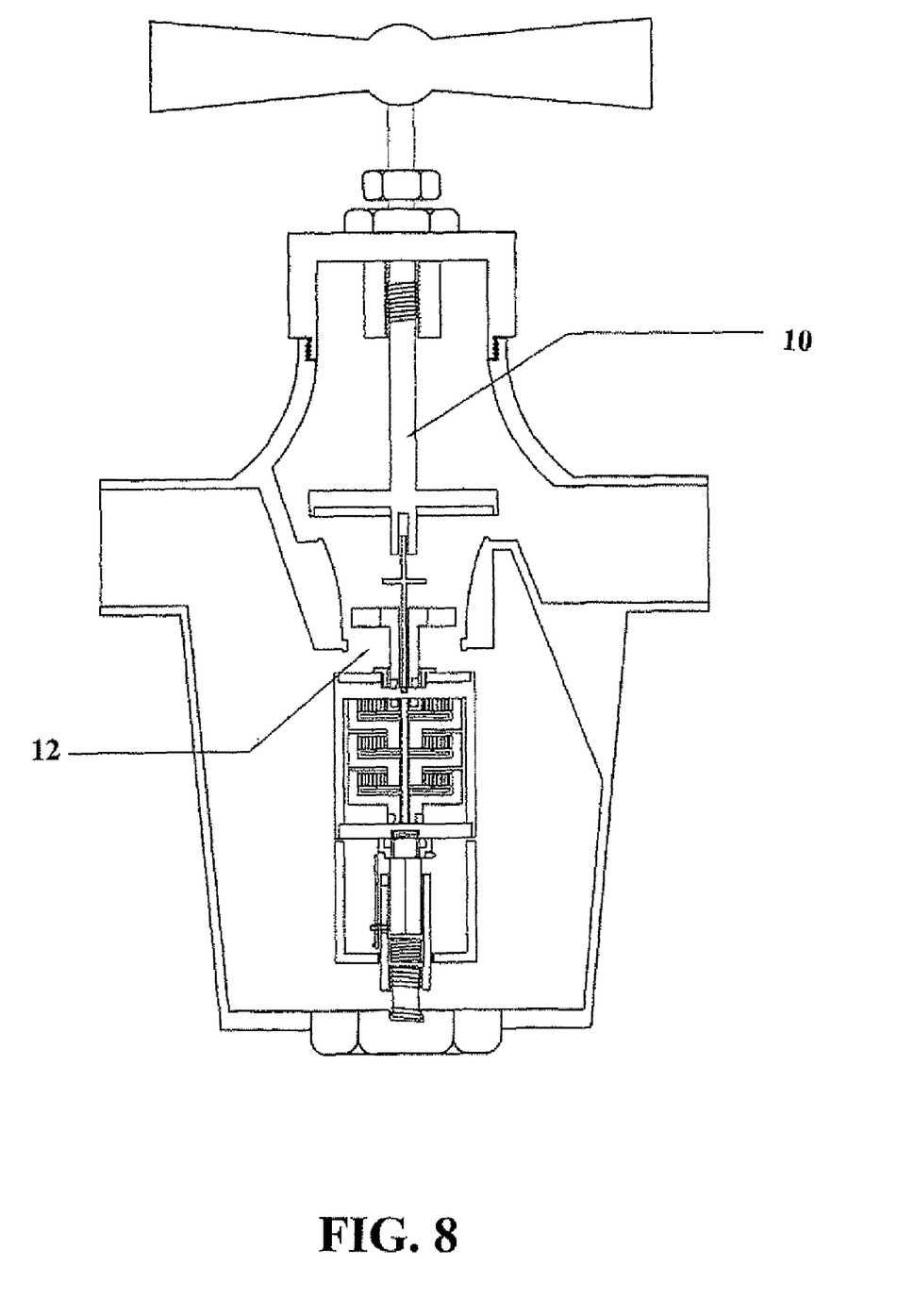
FIG. 8 is a cross-sectional view of a smart valve having two seals sealing flow in two directions.

Double valving could be performed by a single seal smart valve assembly 8, as shown in FIGS. 2-3, to be attached to the neck of the valve 1 having the hand wheel 6 by a valve neck extension 7, which would be more practical and economical for installation, or by a double seal smart valve assembly such as the assemblies 9, 10 shown in FIGS. 7 and 8, respectively. The assembly 9 in FIG. 7 has an additional orifice 11 for a double seal, one side arrangement in an extension 13 of the orifice. The assembly 10 in FIG. 8 has an additional orifice 12 for a double seal, two side arrangement.

As described herein, an example embodiment of the present invention is described in detail only for the single seal type shown in FIGS. 2-3, while alternative embodiments of different types of seals are shown in FIGS. 7-8. As an example, the original closing of a regular mechanical globe valve 1 is performed by turning its hand wheel 6 in normal way, for example, in a clockwise direction. The automatic closing of the valve comes through telescopic expansion of the valve's column 5, shown in FIGS. 3-4, which is located in an expansion chamber 37, which forces the open valve to close. The expansion of the valve's column 5 comes under the pressure of a spring 39 which is kept compressed and held by a ratchet 40 at a critical position by a pin 38.

Release of the ratchet 40 occurs when the liquid flow duration is beyond the limit set by the inhabitant of the building in which the valve 1 is located. The liquid flow duration is not only a time set duration, but instead it is a combination of both time and flow rate of liquid passing through the valve. If the valve is left open fully, then automatic shutdown will come within a short time. If the valve is left open at low flow rate, it will take a longer time to shut down automatically.

As used herein, the term "streamer" is defined as a wheel. As the flow of the liquid passes through the orifice 3 of the valve 1, the liquid rotates a round streamer or water wheel 15, having a driver magnet 16 passing through a nut 17 of a rubber seal 18, in the center of the valve seal 4 which in turn goes through a double magnet 22, 29 to a reduction chamber (gear box) 21 enclosed by a cover 31 to reduce the number of rotations of the top gear and its attached limit disc 33, having a limiting magnet 32, to a portion of one turn, so that the number of rotations are reduced to a maximum of one turn of a disc on the top of the chamber. This disc could be adjusted to a suitable point to activate the ratchet 40 to release the column expansion mechanism.

If the valve is closed in its regular manner, the liquid flow stops, then the set of gears 24 in the reduction chamber 21 are free to turn about the axle 25 in the opposite direction under the effect of a spring 35 to restart again from its original position.

If the valve is kept open for long time then the pointer of the limit disc on the top of the reduction chamber releases the ratchet 40 on the valve's column to expand the main column extension 43 and to close the valve automatically.

After the automatic shutdown, if the hand wheel 6 of the valve is turned by hand to close the valve as per its normal use, such turning of the hand wheel 6 forces the valve column to contract to lock the expansion mechanism (expansion chamber at compression mode) at the same time it hooks the ratchet 40 at a critical position of a pin 38 of the ratchet holder.

The invention has four main parts:

1. The drive parts round streamer 15 or the whirlpooling round streamer. The streamers are rotated mechanically by the flow of liquid through the valve.

2. Speed reduction chamber or gear box 21, which has two functions:

a. Reducing the number of rotations generated by the round streamer, such as the streamer 15, to a portion of one turn.

b. Signaling the expansion chamber 37 by the pointer 34 of the limit disc 33 to expand its column by releasing the pin or hook 38 at the ratchet when the amount of liquid flow is bigger than a preset quantity.

3. Automatic reset system in normal use.

Flashing out the recorder rotation automatically when the flow stops and return to its start position by the spring 35.

4. Expansion chamber.

This mechanism 37 has telescopic expansion of the valve column 5, under the pressure of a spring 39 and hooked by the ratchet 40 at a critical position, which is also mechanical.

Alternative Designs of The Reduction Chamber with Signaling Shutdown

A. Mechanical Designs:

We have two options for a mechanical design.

A1. Reduction through two idle parallel columns 26 and 27, and a set of equal double gears 23 which rotates freely on both columns and separated by a spacer 28.

A2. Reduction through multistage micro planetary gears 24. This option is more expensive but it allows free movement backward of the limit disc 33 without the need to disengage the round streamer, such as the streamer 15.

B. Electronic designs:

This choice needs periodic maintenance to change an inside battery. It may be needed in very sensitive locations, such as in power plants, for example, in a cooling system of an atomic reactor.

The electronic design of the alternative embodiment of the present invention includes a regular electronic current counter 45, which takes its readings from the magnet 22 located on top of the streamer 15 which rotates due to flow of the liquid. The counter 45 flashes out the readings automatically when the flow stops.

Another limit counter may be used which is set by the user as a rule for controlling shutdown. If the reading of the current counter 45 exceeds the reading of the rule counter, then a comparison chip 48 would activate the expansion chamber 37 to expand the column 5 and shutdown the flow.

When the valve is turned back to operation, the valve will move the expansion chamber 37 and be ready for regular operation.

Alternative of Double Valving

In the previous description the present invention was described in terms of a single seal valve as shown in FIGS. 1 and 3. In this option the emergency seal closes the valve by spring pressure. If the liquid is under very high pressure then spring pressure should by very high too.

One alternative embodiment is to have a separate small area seal for emergency then there will be two seals in sequence.

Another alternative embodiment is to have the emergency seal in the opposite direction, to be in the direction of the pressure.

Whirlpooling Round Streamer Alternative

Figure 4:
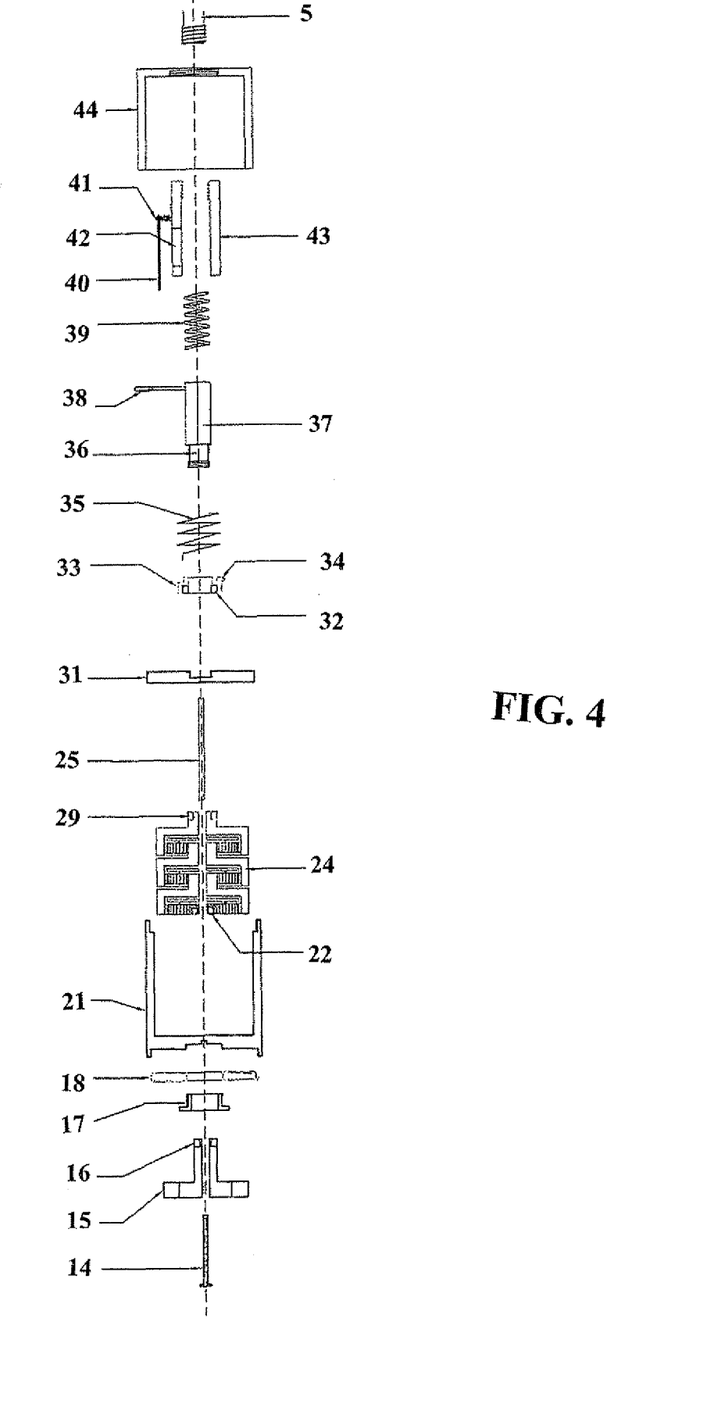
FIG. 4 is a cross-sectional view of a sealing assembly of the smart valve kit in FIG. 2 with planetary gear type components with parts separated.
Figure 5:
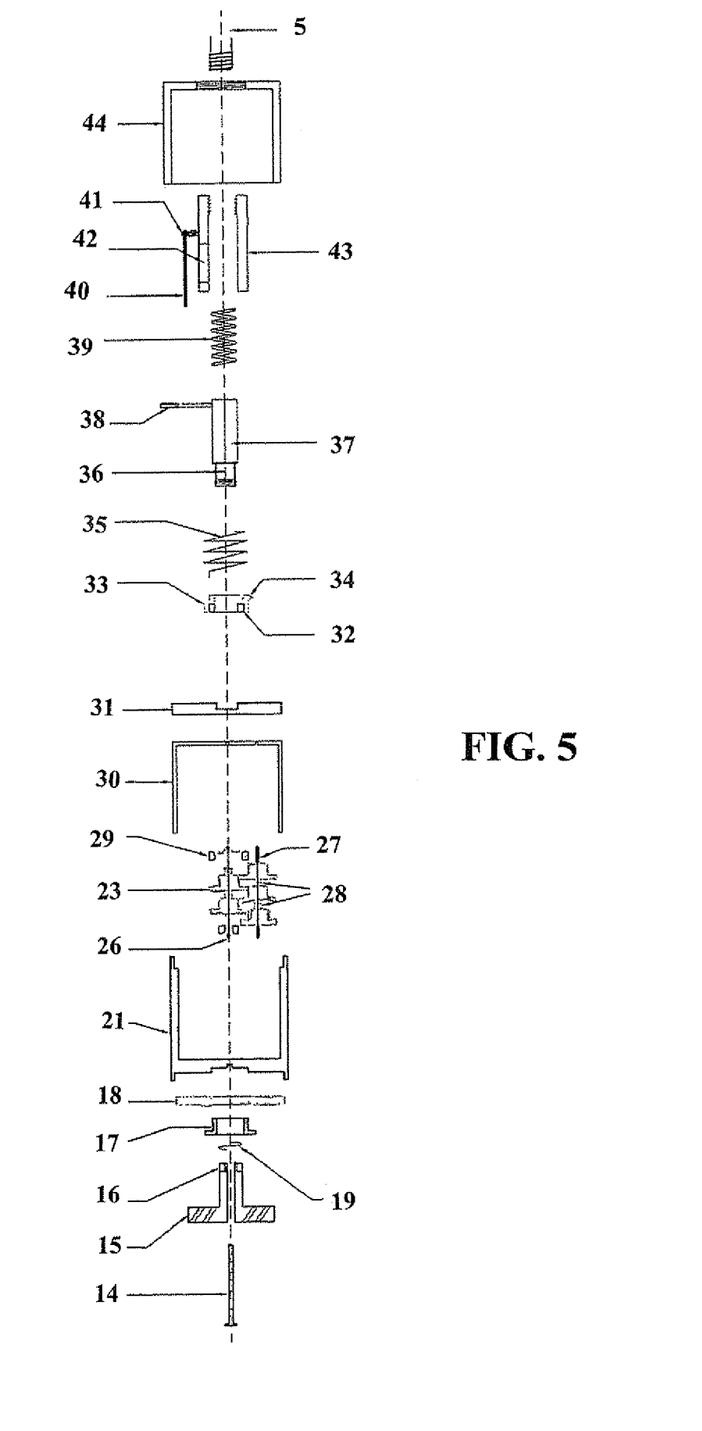
FIG. 5 is a cross-sectional view of an alternative embodiment sealing assembly of the smart valve kit in FIG. 2 using flow difference type components with parts separated.
Figure 6:
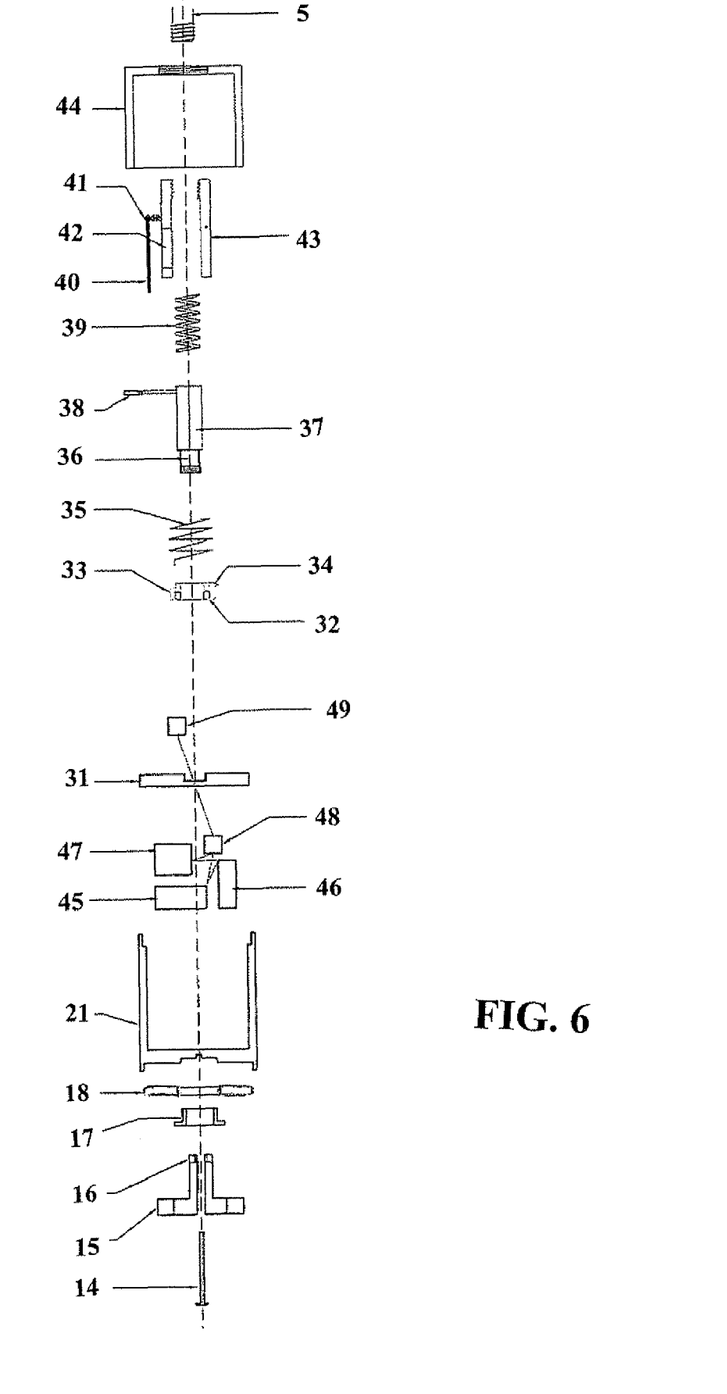
FIG. 6 is a cross-sectional view of another alternative embodiment sealing assembly of the smart valve kit in FIG. 2 using electronic counting components with parts separated.

In a mechanical flashing out of the recorded rotation of the round streamer 15, the valve 1 requires a free backward movement without generating a flow of liquid in an opposite direction. In a planetary gear such free backward movement is possible, while in direct gearing such free backward movement requires disengagement of the round streamer 15. For this reason, in another alternative embodiment, the round streamer 15 of FIGS. 4-6 is replaced by a whirlpooling-type streamer or water wheel, where the flow of liquid generates two movements in both rotational and axial directions for engagement with the reduction chamber 21.

Such a flow stop disengagement using the whirlpooling streamer will be done through a spring 19 to allow the set of gears to rotate free backward to start position.

INDUSTRIAL APPLICABILITY

The smart valve of the present invention does not require any special components except for those devices causing the transfer of movement through at least one magnet to isolate the high pressure end from the low pressure and to isolate small gears from wetting to avoid accumulation of residue especially calcium.

In addition, a smart valve kit make it easy to convert any previously installed valves from a regular valve to a smart valve by extending the old valve neck and insert a new seal assembly.

Implementation Of The Embodiments

FIG. 1 shows a regular globe valve 1 of the prior art having a water inlet 2 and an orifice 3.

FIG. 2 shows a complete smart valve kit of the present invention having a micro planetary gear type assembly.

FIG. 3 shows how the globe valve 1 of the prior art in FIG. 1 has been converted to smart valve by adding the kit shown in FIG. 2.

FIG. 4 shows the components of a smart valve seal.

Components 14-18 are elements forming the wheel which rotates the flow of liquid in the valve and its holding to the frame of a rubber seal.

Components 21, 22, 24, 25, 29, and 31 are elements forming three multistage planetary gears in a casing to reduce the number of rotations of the limit disc.

Components 32, 33, 34 and 35 are the limit disc and its spring to auto set back when the flow stops, and to release the ratchet if the flow exceeds a preset amount.

Component 36 is the holder or guide of the limit disc.

Component 37 is the column valve's extension and component 38 is its pin.

Component 39 is the spring to extend the valve's column.

Component 42 is an opening for movement of the pin 38.

Component 40 is the ratchet.

Component 41 is the axle of the ratchet and its holding spring.

Component 43 is the elongation of the valve column to contain the telescopic expansion.

Component 44 is a protection cylinder for the inner parts.

Component 5 is the end of the valve column of the original globe valve 1 of FIG. 1.

FIG. 5 shows the same assembly as in FIG. 4 with an alternative embodiment operating by a difference in the flowing.

In another alternative embodiment, the wheel 15 is replaced with a whirlpooling streamer to have additional axial movement. A washer spring 19 is included to disengage when the flow stops, with the gears 26-30 to replace the planetary gear.

FIG. 6 shows the same assembly as in FIGS. 4 and 5, with another alternative embodiment providing an electronic counting configuration replacing mechanical counting.

Component 45 shows the reading of a flow wheel, and component 46 is a battery.

Component 47 is a preset counter representing the maximum number of rotations of the counter 45 in the condition when there is an emergency.

Component 48 is a comparison chip to compare the reading of the current counter with the limit to initiate a signal from a signal generating device 49 to initiate shutdown.

FIG. 7 shows a smart valve with two seals from the same direction, with one for regular usage and one to work only in emergency.

FIG. 8 shows a smart valve with two seals in two directions. The emergency one works in the direction of the pressure. This is to be used with an extremely high pressure flow.

PARTS LIST

1 Globe valve
2 Water inlet
3 Orifice
4 Regular seal
5 Valve column
6 Hand wheel
7 Valve neck extension—nipple
8 Complete smart valve set—single seal
9 Complete smart valve set—double seal, one side
10 Complete smart valve set—double seal, two sides
11 Additional orifice—one side, double seal
12 Additional orifice—two sides, double seal
13 Extension of orifice
14 Axle of water wheel
15 Water wheel
16 Driver magnet
17 Nut of rubber seal
18 Rubber seal
19 Spring washer
21 Reduction chamber
22 Driven magnet
23 Set of reduction gears
24 Multistage planetary gear
25 Axle of planetary gear
26 Idle axle of gear—center
27 Idle axle of gear
28 Spacers
29 Output drive magnet
30 Frame of axle
31 Cover of reduction chamber
32 Limit magnet
33 Limit disc
34 Pointer of ratchet release
35 Spring for limit disc return
36 Disc guide
37 Hexagonal column expansion chamber
38 Pin of ratchet holder
39 Spring
40 Ratchet
41 Axle of ratchet
42 Opening for pin movement
43 Main column extension
44 Protection cylinder
45 Current reading counter
46 Battery
47 Limit counter
48 Comparison chip
49 Electronic signal generating device to release the ratchet

What is claimed is:

1. A hydraulic valve having an inlet, an outlet, and a first orifice through which liquid flows in a flow path between said inlet and outlet, the valve comprising:
   a first seal;
   a valve column coupled to said first seal, wherein said valve column is movable between a first position, in which said first seal blocks said first orifice, and a second position in which said first seal allows flow of hydraulic fluid through said first orifice;
   an open/close mechanism coupled to said valve column for controllably moving the column between said first and second positions to open and close the valve when desired;
   a flow-measuring system for measuring the volume of flow through the first orifice when said valve column is moved from said first position to said second position;
   a connecting portion coupled between said seal and valve column for selectively permitting said first seal to move relative to said column;
   a locking member for preventing said connecting portion from moving said first seal relative to said column under normal conditions;
   a release mechanism, responsive to said flow-measuring system, for releasing said locking member when the volume flow exceeds a predetermined value, wherein said connecting portion, upon being released, automatically moves said first seal relative to said column to block said first orifice;
   a first reset mechanism for resetting the locking member; and
   a second reset mechanism for resetting the value in the flow-measuring mechanism, wherein said first and second reset mechanisms are actuated when the valve is closed by said open/close mechanism.

2. The valve recited in claim 1, said valve having a second orifice in the flow path, wherein said valve includes a second seal coupled to said column at a fixed, axial position relative to said column, wherein said second seal blocks said second orifice when said column is in said first position and allows flow through said orifice when said column is in said second position.

3. The valve recited in claim 2, wherein said first seal, when opened, is positioned downstream of said first orifice, and wherein said connecting portion, upon being released, moves said first seal in a direction opposite to the direction of flow.

4. The valve recited in claim 2, wherein said first seal, when opened, is positioned upstream of said first orifice, and wherein said connecting portion, upon being released, moves said first seal in the direction of flow.

5. The valve recited in claim 1, wherein said open/close mechanism comprises a handle for manually opening and closing the valve, and wherein said handle may be used, after the valve has automatically closed, to move the column to said first position and reset the first and second reset mechanisms.

6. The valve recited in claim 2, wherein said open/close mechanism comprises a handle for manually opening and closing the valve, and wherein said handle may be used, after the valve has automatically closed, to move the column to said first position and reset the first and second reset mechanisms.

* * * * *